US010389212B2

(12) United States Patent
Ishimoto et al.

(10) Patent No.: US 10,389,212 B2
(45) Date of Patent: Aug. 20, 2019

(54) MOTOR DEVICE

(71) Applicant: DENSO CORPORATION, Kariya, Aichi-pref. (JP)

(72) Inventors: Yasuhiro Ishimoto, Kariya (JP); Kazuyuki Watanabe, Kariya (JP); Takuya Matsuyama, Kariya (JP)

(73) Assignee: DENSO CORPORATION, Kariya (JP)

(*) Notice: Subject to any disclaimer, the term of this patent is extended or adjusted under 35 U.S.C. 154(b) by 248 days.

(21) Appl. No.: 15/607,816

(22) Filed: May 30, 2017

(65) Prior Publication Data

US 2018/0006520 A1    Jan. 4, 2018

(30) Foreign Application Priority Data

Jul. 1, 2016 (JP) ................. 2016-131711

(51) Int. Cl.
| | |
|---|---|
| *H02K 9/22* | (2006.01) |
| *H02K 11/30* | (2016.01) |
| *F16F 9/30* | (2006.01) |
| *H02K 5/08* | (2006.01) |
| *H02K 11/33* | (2016.01) |
| *H01R 12/71* | (2011.01) |
| *H02K 5/22* | (2006.01) |

(52) U.S. Cl.
CPC ............... *H02K 9/22* (2013.01); *F16F 9/306* (2013.01); *H02K 5/08* (2013.01); *H02K 11/30* (2016.01); *H02K 11/33* (2016.01); *H01R 12/716* (2013.01); *H02K 5/225* (2013.01)

(58) Field of Classification Search
CPC .......... H02K 5/08; H02K 11/30; H02K 11/33; H02K 9/22; H02K 5/225; F16F 9/306; H01R 12/716
See application file for complete search history.

(56) References Cited

U.S. PATENT DOCUMENTS

| 6,830,440 | B1 * | 12/2004 | Riddoch ............... | H02K 5/225 417/353 |
|---|---|---|---|---|
| 2005/0206254 | A1 | 9/2005 | Tsuge et al. | |
| 2007/0242147 | A1 | 10/2007 | Kawai | |
| 2011/0013365 | A1 * | 1/2011 | Oota .................... | B62D 5/0406 361/707 |

(Continued)

FOREIGN PATENT DOCUMENTS

JP    2015-203392 A    11/2015

OTHER PUBLICATIONS

U.S. Appl. No. 15/607,987, filed May 30, 2017, Matsuyama et al.
U.S. Appl. No. 15/608,381, filed May 30, 2017, Matsuyama et al.
U.S. Appl. No. 15/608,259, filed May 30, 2017, Watanabe.

*Primary Examiner* — Mohamad A Musleh
(74) *Attorney, Agent, or Firm* — Posz Law Group, PLC (57) ABSTRACT

A printed circuit board and multiple components, which are mounted on both sides of the printed circuit board, form a circuit to drive a motor. The printed circuit board is opposed to a case at a one side. First thermal conductive portion is interposed between a heat generating component of the components and the case. Second thermal conductive portion is interposed between the circuit board and the case. The first and second thermal conductive portions are formed of the same flexible material, are equipped to the same side of the circuit board, are in contact with both the circuit board and the case, and are located at different positions.

6 Claims, 6 Drawing Sheets

(56) References Cited

U.S. PATENT DOCUMENTS

| | | | |
|---|---|---|---|
| 2012/0039729 A1* | 2/2012 | Horng | F04D 25/0606 |
| | | | 417/410.1 |
| 2013/0187490 A1* | 7/2013 | Hennecke | H02K 5/18 |
| | | | 310/52 |
| 2015/0189794 A1 | 7/2015 | Tashima et al. | |
| 2016/0036288 A1 | 2/2016 | Yamasaki et al. | |
| 2018/0006521 A1* | 1/2018 | Fujimoto | H02K 11/33 |

* cited by examiner

MOTOR DEVICE

CROSS REFERENCE TO RELATED APPLICATION

This application is based on Japanese Patent Application No. 2016-131711 filed on Jul. 1, 2016, the disclosure of which is incorporated herein by reference.

TECHNICAL FIELD

The present disclosure relates to a motor device.

BACKGROUND

Patent Literature 1 discloses a motor device including a case, a motor, and a circuit board. The case includes a cover and a metallic base. The motor is located on a surface of the base on the opposite side of a cover mounting surface. The circuit board is located in an accommodation space of the case and is affixed to the cover mounting surface. The circuit board has a circuit to drive a motor. This kind of the motor device is applied to, for example, a valve timing control apparatus, which uses rotation of a motor to control a valve timing of an internal combustion engine.

In the configuration of Patent Literature 1, a heat generating component, such as a switching element of a control circuit, is mounted on a ceramic substrate to construct a circuit board. The ceramic substrate is affixed to a cover mounting surface of a base. The ceramic substrate is arranged to enable to release heat, which is generated by the heat generating component, to the base via the ceramic substrate. In addition, a tall component, such as a capacitor and/or a coil, is mounted on an electric supply plate other than the ceramic substrate.

(Patent Literature 1)
Publication of Japanese unexamined patent application No. 4468033

It is conceivable to employ, instead of a ceramic substrate, a printed circuit board, which contains resin as a base material, in order to reduce a manufacturing cost, downsizing, and/or the like. In this case, components may be mounted on both sides of the printed circuit board. In the present configuration, heat, which is caused by a heat generating component, can be released via a thermal conduction member to a case, more specifically, for example, a base. The thermal conduction member is, for example, heat dissipation gel having flexibility.

In a configuration where components are mounted on both sides of a printed circuit board, an affixation configuration, in which one side of the printed circuit board is substantially entirely affixed to the case, cannot be employed. In a motor device, a motor and a circuit board are integrated together. Therefore, vibration of the motor is transmitted to the printed circuit board. A double-sided mounting configuration, in which components are mounted on both sides of a printed circuit board, may raise a concern about vibration of the circuit board. As a result, the double-sided mounting configuration may raise a concern about reliability of connection of components.

It is further conceivable to equip a vibration suppression member, such as a rubber member, between a printed circuit board and a case in order to restrict vibration of the printed circuit board. However, additional vibration suppression member may increase a number of components and may increase a manufacturing process.

SUMMARY

It is an object of the present disclosure to produce a motor device having a simple configuration and configured to maintain reliability of a connection structure while securing a heat dissipation property.

According to an aspect of the present disclosure, a motor device comprises a case including a base and a cover. The base is formed of a metallic material and has a surface and a cover mounting surface, which is on an opposite side of the surface. The cover is equipped to the cover mounting surface of the base and defining an accommodation space with the base. The motor device further comprises a motor located on a side of the surface of the base. The motor device further comprises a circuit board located in the accommodation space and including a printed circuit board and a plurality of components forming a circuit to drive the motor. The printed circuit board contains resin as a base material and has a one side and a rear side. The one side is opposed to the base. The rear side is on an opposite side of the one side in a thickness direction. The components are mounted on both the one side and the rear side of the printed circuit board. The motor device further comprises a thermal conduction member having a flexibility and interposed between the circuit board and the case in the thickness direction. The thermal conduction member is in contact with both the circuit board and the case. The components include a heat generating component located on at least one of the one side and the rear side of the printed circuit board. The thermal conduction member includes a first thermal conductive portion and at least one second thermal conductive portion. The first thermal conductive portion is interposed between the heat generating component and the case. The at least one second thermal conductive portion is formed of a material same as a material of the first thermal conductive portion. The at least one second thermal conductive portion is located on a same side as the first thermal conductive portion on the circuit board. The at least one second thermal conductive portion is interposed with the case at a second position different from a first position of the first thermal conductive portion.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

As follows, multiple embodiments will be described with reference to drawings. In multiple embodiments, the same referential numeral will be assigned to an element, which functionally and/or structurally corresponds to another element.

First Embodiment

First, a valve timing control apparatus equipped with a motor equipment according to the present embodiment will be described with reference to FIG. 1.

Figure 1:
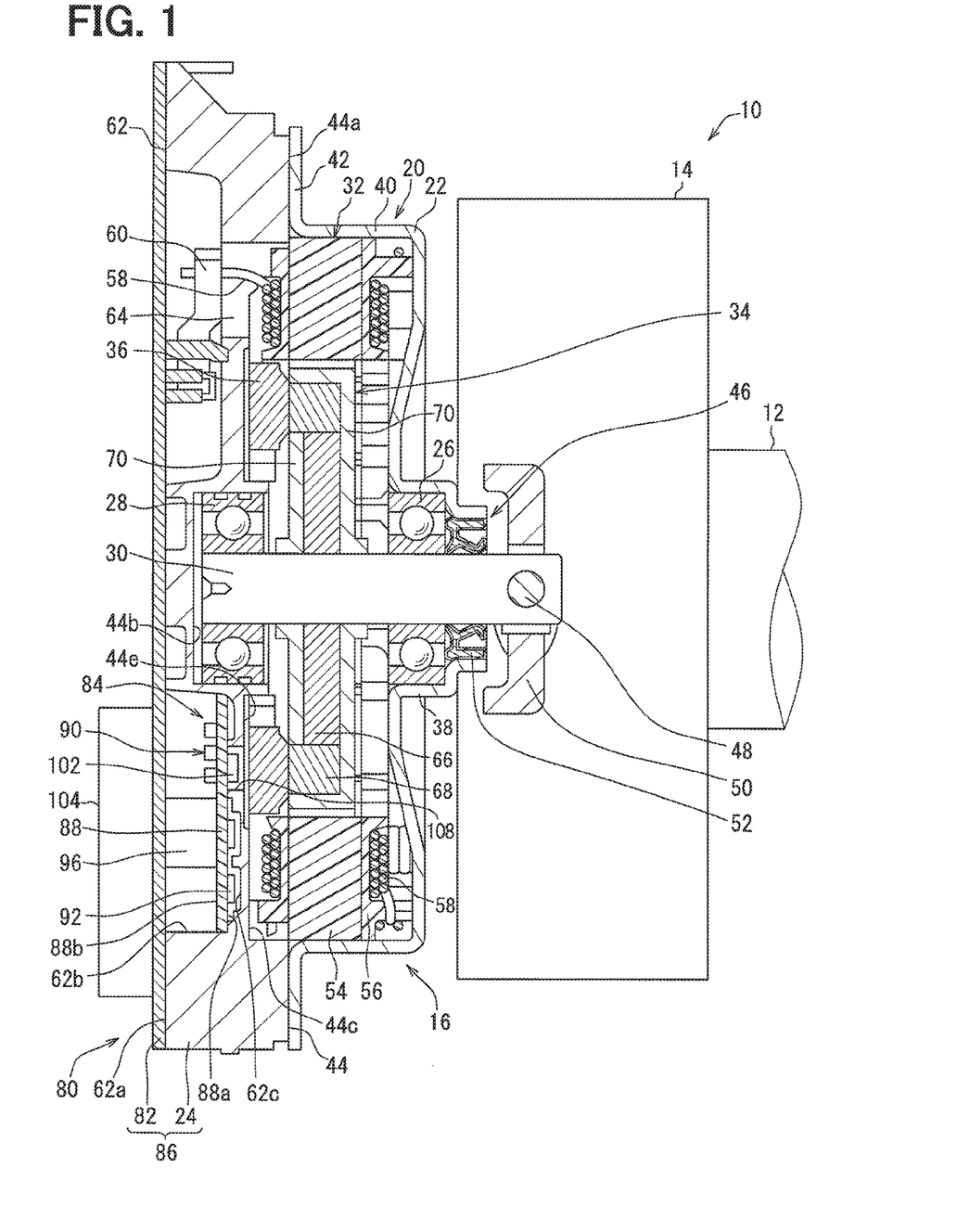
FIG. 1 is a sectional view showing a configuration of a valve timing control apparatus to which a motor device according to the first embodiment is applied.

As shown in FIG. 1, a valve timing control apparatus 10 is used in a transmission system which transmits crank torque from a crank axis of an internal combustion engine (not shown) to a camshaft 12 in a vehicle. The camshaft 12 receives transmission of the crank torque to open and close an intake valve of movable valves (not shown) of the internal combustion engine. The valve timing control apparatus 10 controls a valve timing of the intake valve by using a motor 20, as described later.

The valve timing control apparatus 10 includes a phase control mechanism 14 and a motor device 16. The configuration of the phase control mechanism 14 may be substantially equivalent to the configuration disclosed in Japanese published unexamined application No. 2015-203392. Therefore, the configuration of the phase control mechanism 14 may be referred to the description of Japanese published unexamined application No. 2015-203392. Therefore, FIG. 1 illustrates the phase control mechanism 14 as simplified. In addition, detailed description of the phase control mechanism 14 is omitted in the present description.

Subsequently, the motor device 16 will be described with reference to FIGS. 1 to 5.

As shown in FIG. 1, the motor device 16 includes a motor 20 and an actuating device 80. The motor device 16 may be referred to as a rotary electric device, which accommodates an driving device 80. The driving device 80 may function as an electronic driver unit (EDU).

Figure 2:
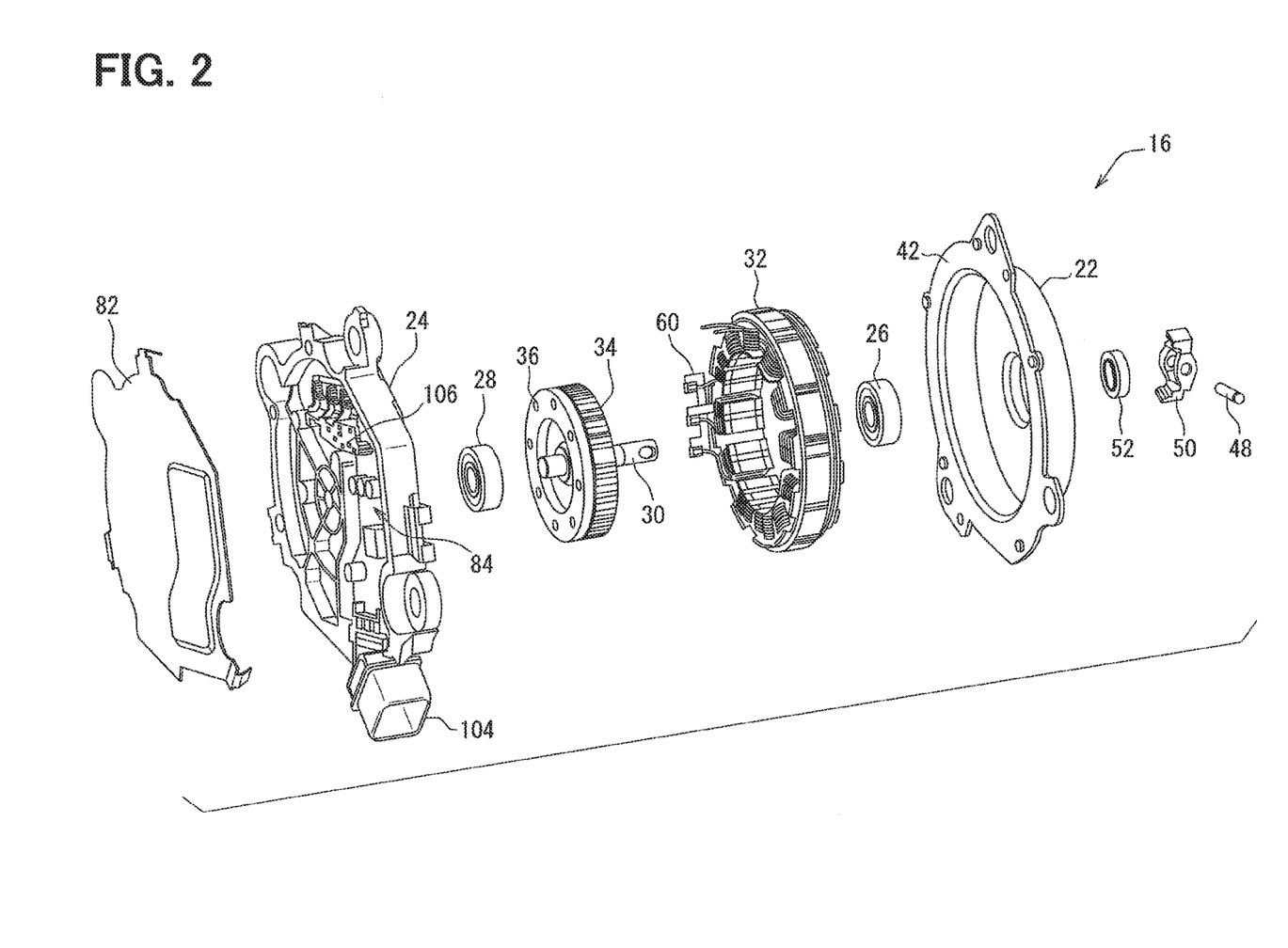
FIG. 2 is an exploded perspective view showing the configuration of the motor device.

The motor 20 is a brushless permanent magnet type synchronous motor. As shown in FIGS. 1 and 2, the motor 20 includes a housing 22, a base 24, bearings 26 and 28, a motor axis 30, a stator 32, a rotor 34, and a sensor magnet 36. The housing 22 is formed of a metallic material, such as a ferrous material, to be substantially in a bottomed tubular shape. The base 24 is formed of an aluminum material to be substantially in a circular plate shape. The base 24 is formed to cover an opening of the housing 22. The housing 22 is mounted to the base 24 to form an accommodation space. The accommodation space contains other elements 26, 28, 30, 32, 34, and 36 of the motor 20. In this way, the housing 22 and the base 24 form a case of the motor 20. In the internal combustion engine, the housing 22 and the base 24 are mounted to a stationary component, such as a chain cover.

Referring to FIG. 1, the housing 22 includes a small diameter portion 38, a large diameter portion 40, and a flange portion 42. The small diameter portion 38 is equipped on the side of a phase control mechanism 14 in an axial direction of the motor axis 30. Hereinafter, the axial direction of the motor axis 30 will be simply referred to as an axial direction. The large diameter portion 40 is equipped on the side of the actuating device 80. The large diameter portion 40 is greater in the diameter than the small diameter portion 38. The flange portion 42 is connected with an end of the large diameter portion 40 on the side of the actuating device 80. The flange portion 42 is extended radially outward. The flange portion 42 is mounted to an outer periphery portion 44a of one side 44 of the base 24 on the side of the phase control mechanism 14.

Each of bearings 26 and 28 supports the motor axis 30 to enable the motor axis 30 to rotate in a normal direction and a reverse direction. An outer ring of the bearing 26 on the side of the phase control mechanism 14 in the axial direction is affixed to an inner surface of the small diameter portion 38 of the housing 22. An inner ring of the bearing 26 is affixed to the motor axis 30. The bearing 26 is substantially entirely located inside the small diameter portion 38 in the axial direction.

Figure 3:
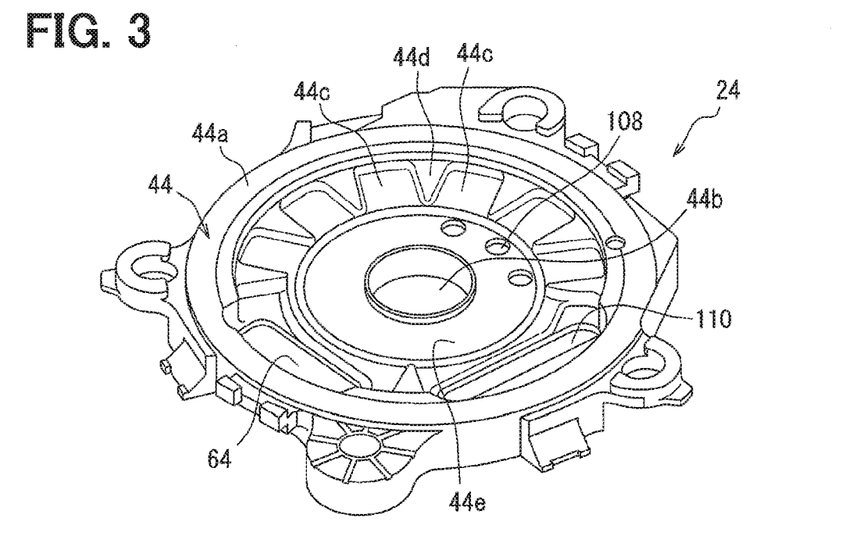
FIG. 3 is a perspective view showing a base viewed from the side of a motor.

As shown in FIGS. 1 and 3, the base 24 has a first recessed portion 44b which is recessed in the one surface 44 relative to the outer periphery portion 44a. The first recessed portion 44b is formed correspondingly to the bearing 28 and the motor axis 30. The first recessed portion 44b is located close to the center of the base 24 which is substantially in a circular plate shape. The first recessed portion 44b has a depth, which is ½ or more of the thickness of the base 24. The bearing 28 and one end of the motor axis 30 are accommodated in the first recessed portion 44b. Specifically, an outer ring of the bearing 28 is affixed to an inner circumferential periphery of the first recessed portion 44b. An inner ring of the bearing 28 is affixed to the motor axis 30. The bearing 28 supports the one end of the motor axis 30 such that the one end does not contact with the base 24.

An opening 46 is formed close to the center of a bottom portion of the housing 22. The motor axis 30 projects through the opening 46 to the outside of the housing 22. The motor axis 30 is connected with the phase control mechanism 14. A through hole is formed at an end of the motor axis 30 on the side of the phase control mechanism 14. Referring to FIGS. 1 and 2, a pin 48 is inserted through the through hole of the motor axis 30 to affix the joint 50 to the motor axis 30. The joint 50 is for connecting the motor axis 30 with the phase control mechanism 14. A seal member 52 in an annular shape is interposed between an inner periphery of the opening 46 of the housing 22 and the motor axis 30. The seal member 52 is equipped on the side of the phase control mechanism 14 relative to the bearing 26.

A stator 32 is located on the side of the one side 44 of the base 24. The stator 32 includes a stator core 54 and windings 58. The stator core 54 is in a tubular shape and includes multiple teeth portions. The windings 58 are wound on the teeth portions via resin bobbins 56, respectively. Each of the stator cores 54 is formed by laminating metallic pieces. The stator cores 54 are arranged along the circumferential direction, which is a rotational direction of the motor axis 30, at a regular interval. The windings 58 are individually wound around the corresponding stator cores 54, respectively. That is, the windings 58 are also arranged along the circumferential direction at the regular interval. Windings 58, which correspond to a U phase, a V phase, and a W phase of the motor 20, are connected to each other via terminals 60. The terminals 60 form a neutral point. The windings 58 are supplied with a driving current through an inner connector 106. In this way, the stator 32 is caused to form a rotating magnetic field which acts on the permanent magnet 68 of the rotor 34. The stator 32 is supported by the housing 22.

As shown in FIG. 3, the base 24 includes multiple second recessed portions 44c and multiple reinforcement portions 44d. The second recessed portions 44c are recessed in the one side 44 relative to the outer periphery portion 44a. The second recessed portions 44c are formed correspondingly to the windings 58 of the stator 32. That is, the second recessed portions 44c are also arranged along the circumferential direction at the regular interval. The windings 58 are accommodated correspondingly in the second recessed portions 44c. The second recessed portions 44c are shallower than the first recessed portions 44b in the axial direction. The second recessed portions 44c may be equivalent to a recessed portion.

The reinforcement portion 44d is formed between the second recessed portions 44c which are adjacent to each other in the circumferential direction. That is, the second recessed portions 44c and the reinforcement portions 44d are arranged alternately in the circumferential direction. The reinforcement portions 44d partition the second recessed portions 44c into multiple regions. In the one side 44, the reinforcement portions 44d are located at a position shallower than the bottom surfaces of the second recessed portions 44c and are located at a position slightly recessed relative to the outer periphery portion 44a. The reinforcement portions 44d are formed in this way to enable to enhance a rigidity of the base 24, compared with a configuration in which a second recessed portion 44c is formed to be in an annular shape.

Figure 4:
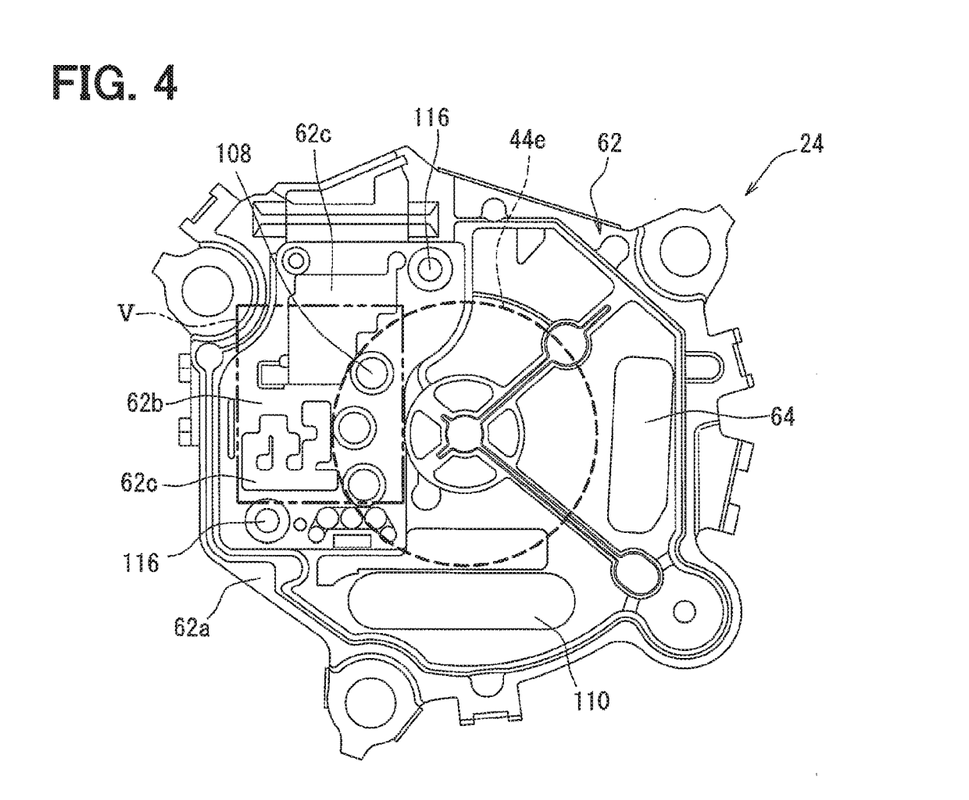
FIG. 4 is a plan view showing the base viewed from the side of a circuit board.

Furthermore, as shown in FIGS. 1, 3, and 4, the base 24 has a through hole 64 which extends from the one side 44 to a rear side 62. The rear side 62 is opposite to the one side 44. The through hole 64 is formed such that the neutral point of the motor 20, that is, the joint portion between the terminal 60 and the windings 58 at the all phases projects from the one side 44 to the side of the rear side 62.

The rotor 34 is rotatably accommodated inside the stator 32 which is in the tubular shape. The rotor 34 is in a disc shape projected radially outward from the motor axis 30. The rotor 34 is rotational in the circumferential direction in both the normal direction and the reverse direction. The rotor 34 includes a rotor core 66, multiple permanent magnets 68, and stationary plates 70. The rotor core 66 is formed by laminating multiple core sheets in a disc shape. The permanent magnets 68 are integrally rotational relative to the rotor core 66. The stationary plates 70 are equipped to both ends of the rotor core 66 in the axial direction. The rotor core 66 may be affixed directly to the motor axis 30 or may be affixed to the motor axis 30 via a fitting member. In the multiple permanent magnets 68, magnetic poles are alternately changed in the circumferential direction.

The sensor magnet 36 is in a ring shape. The sensor magnet 36 is affixed to an outer circumferential peripheral end of the rotor 34 on the side of the base 24. The sensor magnet 36 is rotational integrally with the rotor 34. The sensor magnet 36 is equipped to detect a rotary position of the rotor 34. The sensor magnet 36 is alternately magnetized with an N pole and an S pole at a predetermined angular interval.

As shown in FIGS. 1 and 3, the base 24 has a third recessed portion 44e recessed relative to the outer periphery portion 44a in the one side 44. The third recessed portion 44e is substantially in an annular shape correspondingly to the sensor magnet 36. The third recessed portion 44e accommodates the sensor magnet 36. In the axial direction, the third recessed portion 44e is shallower than the first recessed portion 44b and is deeper than the second recessed portion 44c. The first recessed portion 44b, the third recessed portion 44e, the second recessed portions 44c, and the outer periphery portion 44a are arranged in this order from the axial center of the motor axis 30 radially outward. The third recessed portion 44e may be equivalent to a magnet accommodating portion.

The actuating device 80 includes a cover 82 and a circuit board 84. The base 24 is also a component of the actuating device 80.

The cover 82 is formed of a metallic material, such as a ferrous material, to be substantially in a circular plate shape. The cover 82 is located on the side of the rear side 62 of the base 24. The rear side 62 of the base 24 may be equivalent to a cover mounting surface. The circuit board 84 is located in an accommodation space which is formed by mounting the cover 82 to the base 24. The base 24 and the cover 82 form a case 86 of the circuit board 84. The case 86, which includes the base 24 and the cover 82, may be equivalent to a case.

The circuit board 84 includes a printed circuit board 88 and multiple components 90. The components 90 are mounted on the printed circuit board 88. The printed circuit board 88 includes a base member and a wiring. The base member contains resin as a material. The wiring is equipped to the base member. The printed circuit board 88 has a one surface 88a and a rear side 88b. The one surface 88a is an opposed surface opposed to the base 24 in the axial direction. The rear side 88b is opposite to the one surface 88a in its thickness direction. The thickness direction of the printed circuit board 88 substantially coincides with the axial direction of the motor axis 30.

As shown in FIGS. 1 and 4, the base 24 has an outer periphery portion 62a and a fourth recessed portion 62b in the rear side 62. The outer periphery portion 62a is mounted with the cover 82. The fourth recessed portion 62b is recessed relative to the outer periphery portion 62a in the axial direction. The fourth recessed portion 62b is formed correspondingly to the circuit board 84. The circuit board 84 is mostly accommodated in the fourth recessed portion 62b. More specifically, the circuit boards 84 excluding a part of external connector 104, which will be described later, is accommodated in the fourth recessed portion 62b.

The multiple components 90 are mounted on both the one surface 88a and the rear side 88b of the printed circuit board 88. The components 90 include MOSFETs 92, a driver IC 94, a coil 96, a capacitor 98, 100, and the like. The components 90 are elements forming a circuit together with the wiring of the printed circuit board 88 to drive the motor 20. The MOSFETs 92 form a three-phase inverter to drive the motor 20. More specifically, the MOSFETs 92 include six MOSFET elements 92 mounted on the one side 88a of the printed circuit board 88. The three-phase inverter includes upper arms and lower arms corresponding to three phases. The upper arms of three phases are connected to a high potential power source line. The lower arms of the three phases are connected to a low potential power source line.

The driver IC 94 detects the rotary position of the rotor 34 according to a detection signal of the hall element 102, which will be described later. In addition, the driver IC 94 acquires, from the microcomputer of the ECU (not shown), a signal, which is to instruct the rotational direction and the revolution of the motor 20. The driver IC 94 further generates a gate driving signal for each of the MOSFETs 92 according to the instruction signal and the rotary position. The driver IC 94 further sends the gate driving signal to each of the MOSFETs 92.

Figure 5:
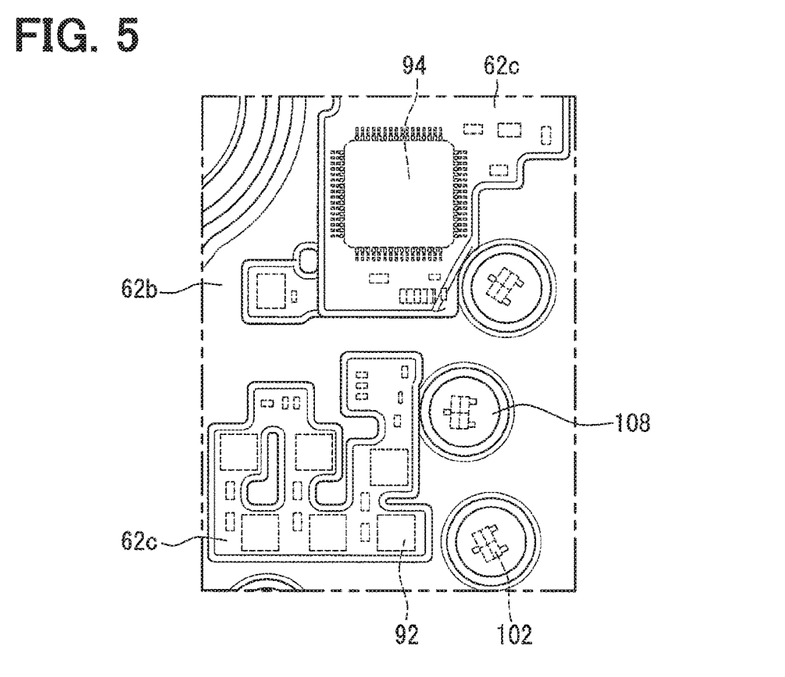
FIG. 5 is a view showing the physical relationship between the base and components of the circuit board in a region V shown by a two-point chain line in FIG. 4.

As shown in FIGS. 1, 4, and 5, the base 24 has fifth recessed portions 62c in the rear side 62. Each of the fifth recessed portions 62c is recessed further relative to the bottom surface of the fourth recessed portion 62b. The fifth recessed portion 62c is formed correspondingly to at least a part of a component, among the components 90 located on the one side 88a of the printed circuit board 88, excluding the hail element 102. The detail will be described later. In FIG. 5, the components 90 are illustrated with a dashed line in order to show the physical relationship between the base 24 and the components 90.

The fifth recessed portion 62c is formed correspondingly to each of the MOSFETs 92 and the driver IC 94. As shown in FIG. 4 being a projection view along the axial direction, the fifth recessed portion 62c is located at a position, which does not overlap with the third recessed portion 44e. That is, the fifth recessed portion 62c is located at a position, which does not overlap with the sensor magnet 36. In FIG. 4, the dashed line being a reference line shows an outer circumferential periphery of the third recessed portion 44e formed on the side of the one side 44. In the present embodiment, a part of the MOSFETs 92 is accommodated in the fifth recessed portion 62c in the axial direction.

The coil 96 and the capacitors 98, 100 are mounted on the rear side 88b in the printed circuit board 88. The coil 96 and the capacitors 98, 100 are tall components taller than other components 90 in the axial direction. A noise filter is formed with the coil 96 and the capacitor 98. The capacitor 100 is a smoothing capacitor. In the present embodiment, three capacitors 100 are mounted on the printed circuit board 88 for stabilization. The capacitor 100 is mounted on a rear side portion of a mounting region where the multiple MOSFETs 92 are mounted in the printed circuit board 88.

In addition to the above-specified elements, the components 90 further include hall elements 102, an external connector 104, and an internal connector 106. Each of the hall elements 102 detects the rotary position of the rotor 34 and sends the detection signal to the driver IC 94. The hall elements 102 are mounted on the printed circuit board 88 in the one side 88a. The hall elements 102 are equipped correspondingly to the sensor magnets 36. In the present embodiment, the hall elements 102 include three elements equipped at a predetermined rotation angular interval along the circumferential direction.

A part of the external connector 104 is projected to the outside through an opening (not shown) formed with the base 24 and the cover 82. The external connector 104 electrically relays the ECU with the driver IC 94. Specifically, an instruction signal of the motor 20 is sent from a microcomputer (not shown) of the ECU, and the instruction signal is received by the circuit board 84 through the external connector 104. In addition, a diagnostic signal, which is sent from the circuit board 84, and a signal, which represents an actual revolution speed and an actual rotational direction of the motor 20, are received by the ECU through the external connector 104. The circuit board 84 is supplied with an electric power through the external connector 104.

The internal connector 106 electrically relays the three-phase output lines of the inverter with the winding 58 of the motor 20. The external connector 104 and the internal connector 106 are equipped to the printed circuit board 88 and located on the side of the rear side 88b. In this way, the external connector 104 and the internal connector 106 are mounted on the printed circuit board 88. The MOSFET 92, the driver IC 94, the external connector 104, and the internal connector 106 may be equivalent to heat generating components.

The base 24 has through holes 108 and 110, which extend from the one side 44 to the rear side 62. The through holes 108 are formed correspondingly to the hall elements 102. Each of the hall elements 102 is individually accommodated in corresponding one of the through holes 108. The present configuration, in which the hall elements 102 are equipped in the through holes 108, respectively, enables to downsize the motor device 16 in the axial direction. In addition, the present configuration further enables to avoid decrease in the sensor sensitivity caused by an eddy current arising in the metallic base 24. The through holes 108 are formed in the bottom surface of the third recessed portion 44e. The through holes 110 are formed to enable electrical connection between the internal connector 106 and the winding 58.

Subsequently, a heat dissipating configuration and a vibration-damping configuration of the actuating device 80 will be described with reference to FIGS. 6 to 10.

Figure 6:
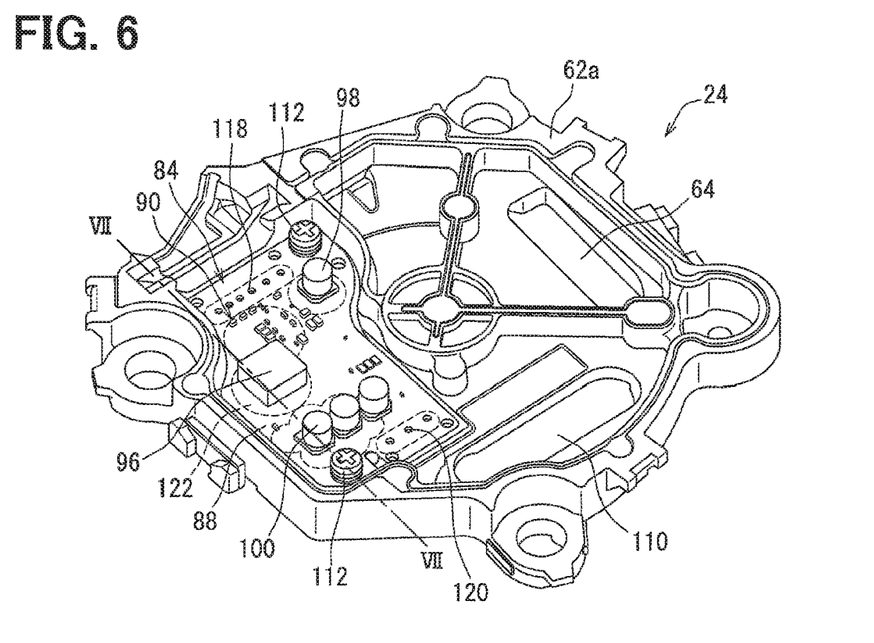
FIG. 6 is a view showing a state where the circuit board is affixed to the base.
Figure 7:
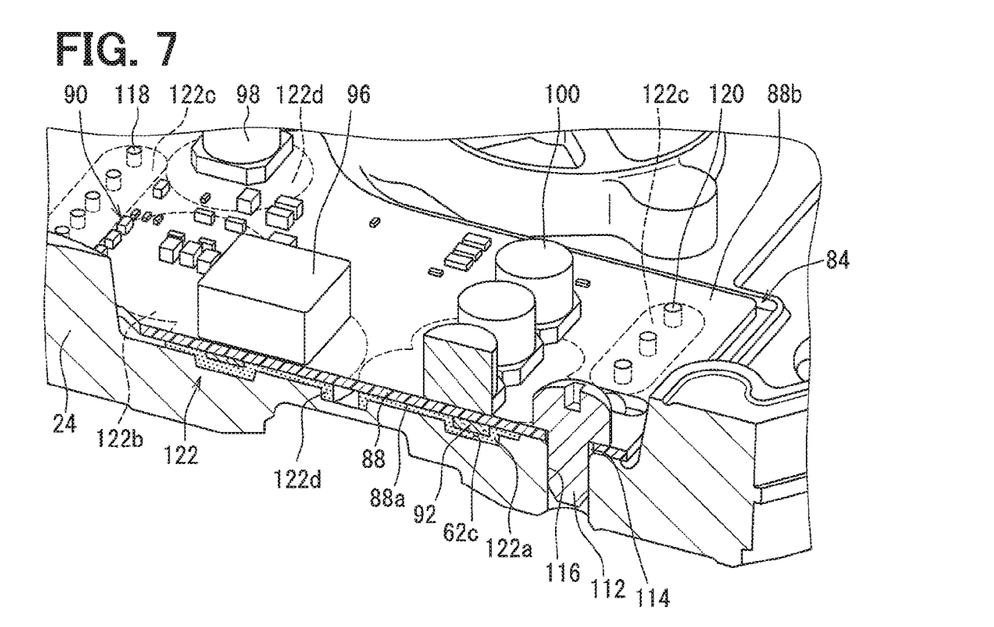
FIG. 7 is a sectional view taken along the line VII-VII line in FIG. 6.
Figure 8:
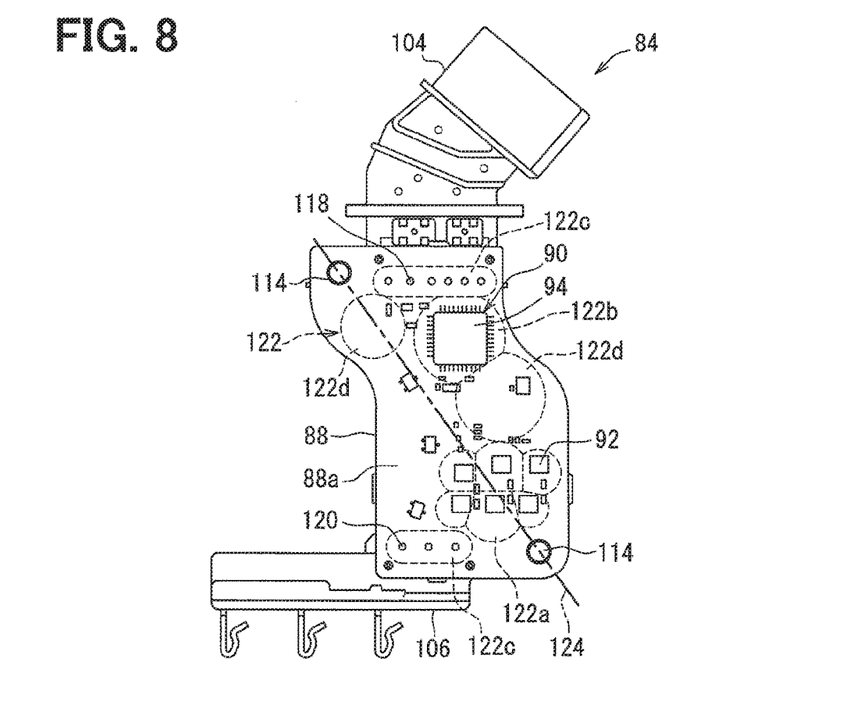
FIG. 8 is a plan view showing a position of a heat dissipation gel applied in the circuit board.
Figure 9:
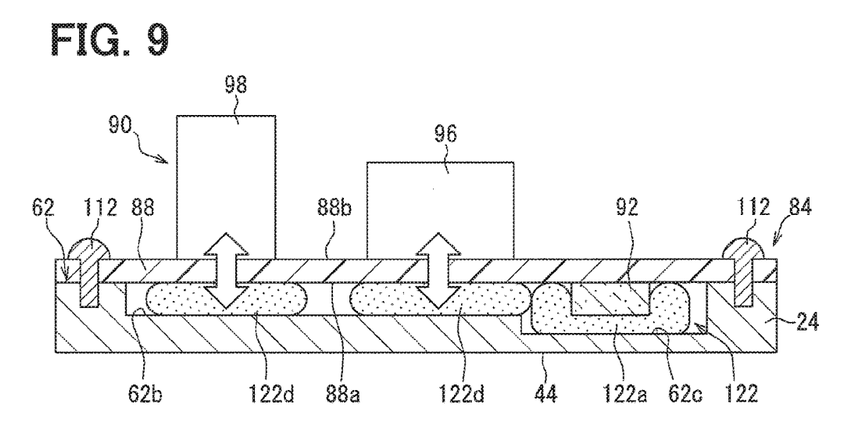
FIG. 9 is a sectional view showing an effect of the heat dissipation gel.

In FIGS. 6, 7, 9, and 10, the cover 82 is omitted for convenience of explanation. In FIGS. 6 and 7, the external connector 104 and the internal connector 106 are omitted in order to illustrate the arrangement of a heat dissipation gel 122, which will be described later. In addition, a dashed line shows the heat dissipation gel 122 located on the one side 88a. In FIG. 8, the dashed lines show application regions of the heat dissipation gel 122 in the circuit board 84, respectively. In FIG. 9, the circuit board 84 and the base 24 are partially omitted and/or are partially simplified in order to emphasize an effect of the heat dissipation gel 122.

As shown in FIGS. 6 to 8, the printed circuit board 88 is located on the rear side 62 of the base 24. The printed circuit board 88 is substantially in a crank shape so as to circumvent the bearing 28 and the motor axis 30. The printed circuit board 88 is equipped to the rear side 62 not to overlap with the first recessed portion 44b in the projection view viewed in the axial direction. That is, printed circuit board 88 is equipped to circumvent the bearing 28 and the motor axis 30. As shown in FIG. 6, the printed circuit board 88 is affixed to the base 24 with, for example, two screws 112.

As shown in FIG. 8, the printed circuit board 88 has through holes 114, which are formed at diagonal positions in the printed circuit board 88. The through holes 114 are formed correspondingly to the screws 112. The screw holes 116 are opened on the bottom surface of the fourth recessed portion 62b. The screws 112 are inserted into the through holes 114, respectively, and are screwed to the screw holes 116.

As shown in FIGS. 6 to 8, the printed circuit board 88 has through holes 118 and through holes 120. The through holes 118 are formed on a one-end side of the printed circuit board 88 in the extended direction. The through holes 120 are formed on the other-end side of the printed circuit board 88 in the extended direction. Terminals of the external connector 104 are inserted into the through holes 118 and are soldered. On the other hand, terminals of the internal connector 106 are inserted into the through hole 120 and are soldered. As shown in FIG. 8, the through holes 114 and 118 are arranged substantially along one row on the one-end side of the printed circuit board 88, and the through holes 114 and 120 are arranged substantially along one row on the other-end side of the printed circuit board 88.

As shown in FIGS. 6 to 10, the actuating device 80 includes the heat dissipation gel 122. The heat dissipation gel 122 is a thermal conduction member having a flexibility. The heat dissipation gel 122 is formed of, for example, a silicone-based material and may contain additive such as metal oxide to enhance a thermal conductivity. The additive may be, for example, zinc oxide. Other than the heat dissipation gel 122, for example, heat dissipation grease may be used as the thermal conduction member.

The heat dissipation gel 122 is interposed between the circuit board 84 and the case 86 in the thickness direction of the printed circuit board 88. The heat dissipation gel 122 is in contact with both the circuit board 84 and the case 86. The heat dissipation gel 122 is interposed between the circuit board 84 and the case 86 at multiple locations. The heat dissipation gel 122 includes first thermal conductive portions 122a, 122b, and 122c and a second thermal conductive portion 122d.

The first thermal conductive portions 122a, 122b, and 122c are interposed between the heat generating component and the case 86. The first thermal conductive portions 122a, 122b, and 122c mainly transmit heat, which is generated by the heat generating component, to the case 86.

As shown in FIGS. 7 to 10, a base 24 is opposed to the one side 88a, which is a mounting surface of the MOSFET 92. The first thermal conductive portion 122a is interposed between the MOSFET 92 and the base 24. The fifth recessed portion 62c of the base 24 has a bottom surface, which is formed correspondingly to the MOSFET 92. The first thermal conductive portion 122a is, more specifically, interposed between the MOSFET 92 and the bottom surface of the base 24. The first thermal conductive portion 122a is further interposed between a circumferential portion of the MOSFET 92 in the one side 88a and the bottom surface of the base 24. The first thermal conductive portion 122a is directly in contact with the MOSFET 92. In this way, the present configuration enables to dissipate heat, which is generated by the MOSFET 92, to the base 24 via the first thermal conductive portion 122a efficiently. The first thermal conductive portion 122a is located in the fifth recessed portion 62c and is held at a position corresponding to the MOSFET 92.

Figure 10:
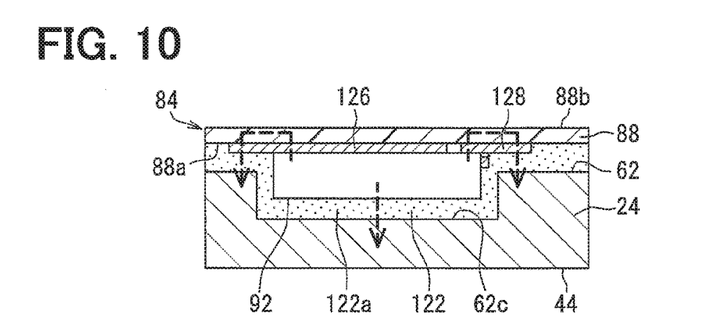
FIG. 10 is an enlarged sectional view showing a surrounding of a MOSFET.

As described above, the first thermal conductive portion 122a is further in contact with the circumference portion of the MOSFET 92 in the one surface 88a of the printed circuit board 88. In this way, as shown in FIG. 10, the first thermal conductive portion 122a surrounds the wirings 126 and 128, which are located on the one side 88a of the printed circuit board 88 and are electrically connected with the MOSFET 92. The wiring 126 is connected to the drain of the MOSFET 92. The wiring 128 is connected to the source of the MOSFET 92. It is noted that, as not being illustrated, a wiring, which is connected to a gate of the MOSFET 92, is also located on the rear side of the wiring 128. This wiring is also surrounded by the first thermal conductive portion 122a.

In addition, as described above, the capacitor 100 is mounted on a rear side portion of the mounting region of the MOSFET 92 in the rear side 88b of the printed circuit board 88. In this way, the first thermal conductive portion 122a is interposed between the capacitor 100 and the base 24 the axial direction.

The first thermal conductive portion 122b is interposed between the driver IC 94 and the base 24, which is opposed to the one side 88a being the mounting surface of the driver IC 94. More specifically, the first thermal conductive portion 122b is interposed between both the driver IC 94 and the circumference portion of the driver IC 94 in the one side 88a and the fifth recessed portion 62c. The fifth recessed portion 62c is formed in the base 24 corresponding to the driver IC 94. The first thermal conductive portion 122b is directly in contact with the driver IC 94. The present configuration enables to transmit heat, which is generated by the driver IC 94, efficiently via the first thermal conductive portion 122b to the base 24. The first thermal conductive portion 122b is located in the fifth recessed portion 62c and is held at a position corresponding to the driver IC 94.

The first thermal conductive portion 122c is interposed between the base 24 and both a mounting portion of the terminal of the external connector 104 and the circumference portion of this mounting portion in the printed circuit board 88. In addition, another of the first thermal conductive portion 122c is interposed between the base 24 and both the mounting portion of the terminal of the internal connector 106 and the circumference portion of this mounting portion in the printed circuit board 88. Either of the first thermal conductive portions 122c is in contact with the one side 88a of the printed circuit board 88. The external connector 104 and the internal connector 106 are inserted into and mounted on the printed circuit board 88. The first thermal conductive portion 122c is directly in contact with external connector 104 and the terminal of the internal connector 106. In this way, the present configuration enables to transmit heat of the terminals of the external connector 104 and the internal connector 106 via the first thermal conductive portion 122c to the base 24 efficiently.

The second thermal conductive portion 122d is formed of the same material as that of the first thermal conductive portion 122a. The second thermal conductive portion 122d is located on the same one side 88a as the first thermal conductive portion 122a relative to the printed circuit board 88. The second thermal conductive portion 122d is interposed between the case 86 and the printed circuit board 88 at a position (second position) different from the position (first position) of the first thermal conductive portion 122a. The second thermal conductive portion 122d restricts vibration of the printed circuit board 88 mainly with a damper effect.

According to the present embodiment, the thermal conductive portions are interposed between the base 24 and the rear side portions of the mounting regions of the coil 96 and the capacitor 98, which are tall components, in the one side 88a of the printed circuit board 88. As shown in FIGS. 8 and 9, the second thermal conductive portion 122d is interposed between the base 24 and the coil 96 and is in contact with the first thermal conductive portion 122a. To the contrary, as shown in FIG. 8, the second thermal conductive portion 122d is interposed between the base 24 and the capacitor 98 and is in contact with the first thermal conductive portion 122c, which corresponds to the external connector 104. The heat dissipation gel 122 is applied not to an entire surface of the one side 88a surface of the printed circuit board 88 but to multiple local portions on the one side 88a surface of the printed circuit board 88.

In FIG. 8, the two-point chain line shows the virtual straight line 124, which virtually connects the two through holes 114 formed in the printed circuit board 88. The virtual straight line 124 is a straight line, which connects the affixed portions of the printed circuit board 88 at which the printed circuit board 88 is affixed with the screws 112. Among the heat dissipation gel 122, in addition to the first thermal conductive portion 122a, the second thermal conductive portion 122d is located on the virtual straight line 124. The first thermal conductive portion 122a corresponds to a part of the multiple MOSFETs 92. The second thermal conductive portion 122d corresponds to the capacitor 98.

Subsequently, effects of the motor device 16 according to the present embodiment will be described. In the following, among the first thermal conductive portions 122a, 122b, and 122c, the first thermal conductive portion 122a, which is interposed between the base 24 and the MOSFET 92, will be described as an example. It is noted that, the following description may be applicable to the remaining first thermal conductive portions 122*b* and 122*c*.

Figure 11:
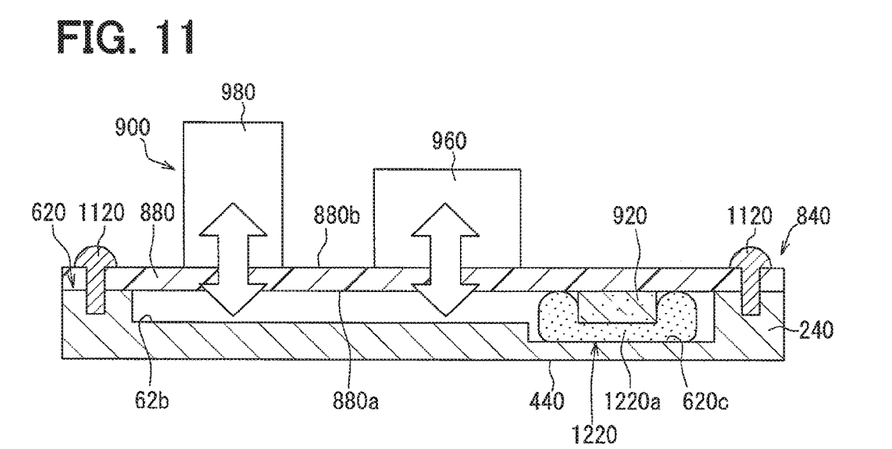
FIG. 11 is a sectional view showing a configuration, which corresponds to FIG. 9, according to a comparative example.

FIG. 11 is a sectional view showing an comparative example and corresponds to FIG. 9. In FIG. 11, reference numerals of elements in the comparative example, which are related to those of the present embodiment, are denoted by being multiplied by 10 times. For example, the screw 112 in the present embodiment is demoted with a screw 1120 in the comparative example.

As shown in FIG. 11, in the motor device of the comparative example, a heat dissipation gel 1220 is interposed between a MOSFET 920 and a base 240. The base 240 is opposed a one side 880*a* of a printed circuit board 880. Specifically, the heat dissipation gel 1220 is interposed between the MOSFET 920 with a circumference portion of the MOSFET 920 in the one side 880*a* and a fifth recessed portion 620*c*. The fifth recessed portion 620*c* is formed in the base 240 and is located corresponding to the MOSFET 920. The heat dissipation gel 1220 is equipped with the first thermal conductive portion 1220*a* in this way. It is noted that, the heat dissipation gel 1220 does not have the second thermal conductive portion.

In the configuration of the comparative example, when vibration of a motor is transmitted to the circuit board 840, vibration of the printed circuit board 880 can be damped with a damper effect, that is, a vibration attenuation effect of the first thermal conductive portion 1220*a* in a portion in which the first thermal conductive portion 1220*a* is interposed. It is further noted that, the first thermal conductive portion 1220*a* is equipped to a corresponding limited local part in the printed circuit board 880. Therefore, the effect of vibration damping is restrictive only with the first thermal conductive portion 1220*a*. In the configuration of the comparative example, the printed circuit board 880 may vibrate at, for example, a portion at which the first thermal conductive portion 1220*a* is not interposed.

In addition, in the comparative example, the heat dissipation gel 1220 is not interposed between the base 240 and the tall components including the coils 960 and the capacitors 980 in the thickness direction. The coil 960 and the capacitor 980 are taller than other components 900 and therefore are apt to cause resonance in the printed circuit board 880 to vibrate the printed circuit board 880. For this reason, stress may concentrate on a mounting portion of the tall components, such as the coil 960 and the capacitor 980. Specifically, stress may concentrate on a solder joined portion between the tall components and the printed circuit board 880. Consequently, reliability may decrease at a connected portion such as the solder joined portion.

To the contrary, according to the present embodiment, the first thermal conductive portion 122*a* enables to release the heat, which is generated by the MOSFET 92 being the heat generating component, to the base 24. In particular, according to the present embodiment, the first thermal conductive portion 122*a* is in contact with the MOSFET 92. Therefore, the present configuration enables to release heat, which is generated by the MOSFET 92, efficiently to the base 24. It is noted that, the second thermal conductive portion 122*d* also enables to release heat, which is generated by the circuit board 84, to the base 24.

In addition, as shown in FIG. 9, the heat dissipation gel 122 includes the second thermal conductive portion 122*d* in addition to the first thermal conductive portion 122*a*. The second thermal conductive portion 122*d* is equipped at the position, which is different from the position of the first thermal conductive portion 122*a*, on the same side as the first thermal conductive portion 122*a* in the circuit board 84. The main purpose of the second thermal conductive portion 122*d* is not necessarily to dissipate heat, which is generated by the components 90, to the case 86. The main purpose of the second thermal conductive portion 122*d* may be to restrict vibration of the printed circuit board 88. Therefore, the second thermal conductive portion 122*d* is enabled to produce the damper effect to another component than the heat generating component thereby to restrict vibration of the printed circuit board 88 caused by vibration of the motor 20. The present configuration enables to restrict stress concentration from arising in the mounting portion of the components 90 due to vibration of the printed circuit board 88. As a result, the present configuration enables to maintain reliability of the connected portion.

It is noted that, the second thermal conductive portion 122*d* further enables to damp vibration transmitted to the printed circuit board 88 from components other than motor 20. More specifically, the second thermal conductive portion 122*d* enables to damp, for example, vehicle vibration, such as a vibration of the engine.

In addition, the second thermal conductive portion 122*d* is formed of the same material as that of the first thermal conductive portion 122*a*. The second thermal conductive portion 122*d* is equipped on the same side as the first thermal conductive portion 122*a* in the circuit board 84. Therefore, the first thermal conductive portion 122*a* and the second thermal conductive portion 122*d* can be formed of the same material in the same application process. Accordingly, the present configuration enables to restrict the number of components and to restrict increase in the manufacturing process.

As described above, the motor device 16 of the present embodiment enables to maintain reliability of the connected portion while securing heat dissipation property with a simple configuration.

In addition, according to the present embodiment, the heat dissipation gel 122 is applied not entirely but locally to two or more positions on the one side 88*a* of the printed circuit board 88. Therefore, the present configuration enables to produce the above-described effect while reducing an amount of application of the heat dissipation gel 122.

Furthermore, according to the present embodiment, the coil 96 and the capacitor 98 are mounted on the rear side 88*b* of the printed circuit board 88. In addition, the second thermal conductive portion 122*d* is interposed between the base 24 and the rear side of the mounting region of the coil 96 on the one side 88*a* of the printed circuit board 88. In addition, the second thermal conductive portion 122*d* is interposed between the base 24 and the rear side of the mounting region of the capacitor 98 in the one side 88*a*. In the present configuration, the second thermal conductive portion 122*d* is interposed at the rear side where the coil 96 and the capacitor 98 being the tall components are mounted. Therefore, the present configuration enables to restrict vibration of the coil 96 and the capacitor 98. Therefore, the present configuration enables to maintain reliability of the connection at the mounting portions of the coil 96 and the capacitor 98.

It is noted that, the capacitor 100, which is the tall component, is mounted on the rear side of the mounting region of the MOSFET 92. Accordingly, the first thermal conductive portion 122*a* enables to restrict vibration of the capacitor 100 and thereby to maintain reliability of the connection of the mounting portion of the capacitor 100.

It is noted that, the printed circuit board 88 vibrates at the two affixed portions as nodes where the printed circuit board 88 is affixed with the two screws 112, respectively. Oscillation of the printed circuit board 88 becomes greater on the virtual straight line 124, which connects the affixed portions therebetween. In the present embodiment, the second thermal conductive portion 122d corresponding to the capacitor 98 is equipped on the virtual straight line 124. Therefore, the present configuration enables to restrict vibration of the printed circuit board 88 effectively.

In addition, according to the present embodiment, the fifth recessed portion 62c is equipped in the rear side 62 of the base 24 correspondingly to the MOSFETs 92. Furthermore, the first thermal conductive portion 122a is located at the fifth recessed portion 62c to be in contact with the MOSFETs 92. Therefore, the fifth recessed portion 62c is enabled to regulate movement of the first thermal conductive portion 122a (heat dissipation gel 122) and to maintain the first thermal conductive portion 122a (heat dissipation gel 122) at the predetermined position corresponding to the MOSFETs 92. Thus, the present configuration enables to dissipate heat of the MOSFETs 92 to the base 24 via the first thermal conductive portion 122a efficiently.

In addition, the present configuration enables to reduce the size of the motor device 16 in the axial direction. In particular, according to the present embodiment, a part of the MOSFETs 92 is located inside the fifth recessed portion 62c in the axial direction. Therefore, the present configuration enables to further reduce the size of the motor device 16.

In addition, according to the present embodiment, the third recessed portion 44e is formed on the one side 44 of the base 24. In addition, the sensor magnet 36 is accommodated in the third recessed portion 44e. Therefore, the present configuration enables to reduce the size of the motor device 16 in the axial direction.

In addition, according to the present embodiment, the first recessed portion 44b is formed on the one side 44 of the base 24. In addition, the one end of the motor axis 30 and the bearing 28 are accommodated in the first recessed portion 44b. The printed circuit board 88 is substantially in the crank form to circumvent the bearing 28 and the motor axis 30. The printed circuit board 88 is located on the rear side 62 such that the printed circuit board 88 does not overlap with the first recessed portion 44b in the projection view along the axial direction. According to the present configuration, the printed circuit board 88 does not overlap with the bearing 28 and the motor axis 30 in the projection view along the axial direction. Therefore, the motor device 16 can be downsized.

In addition, according to the present embodiment, the multiple second recessed portions 44c and the multiple reinforcement portions 44d are equipped on the one side 44 of the base 24. The windings 58 are accommodated in the second recessed portions 44c, respectively. This configuration enables to downsize the motor device 16 in the axial direction. In addition, the second recessed portions 44c and the reinforcement portions 44d are arranged alternately in the circumferential direction. Therefore, the present configuration enables to enhance rigidity of the base 24 while enabling to downsize the motor device 16, compared with a configuration where the second recessed portion 44c is in an annular shape.

In addition, according to the present embodiment, the MOSFETs 92 and the driver IC 94 are equipped to avoid the sensor magnet 36 in the projection view along the axial direction. In addition, the fifth recessed portions 62c are equipped correspondingly to the MOSFETs 92 and the driver IC 94. That is, the third recessed portion 44e, which accommodates the sensor magnet 36, and the fifth recessed portion 62c corresponding to the MOSFETs 92 and the driver IC 94 are equipped to the base 24 not to overlap with each other in the projection view along the axial direction. Therefore, the present configuration enables to further downsize the motor device 16 in the axial direction.

Furthermore, according to the present embodiment, the first thermal conductive portion 122a surrounds the wirings 126 and 128, which are electrically connected to the MOSFETs 92 being the heat generating components. Therefore, the present configuration enables to dissipate heat from the MOSFETs 92 and the wirings 126 and 128 to the base 24 via the first thermal conductive portion 122a. In addition, according to the present configuration, the first thermal conductive portion 122a is further in contact with the circumference portion of the MOSFET 92 in the printed circuit board 88. Therefore, the present configuration also enables to restrict vibration of the printed circuit board 88 by using the first thermal conductive portion 122a. It is noted that, the heat dissipation gel 122 is not limited to surround the wirings 126 and 128. The heat dissipation gel 122 may surround another wiring portion in the printed circuit board 88.

The disclosure of the specification is not limited to the comparative examples. The disclosure includes the comparative examples and modifications made by a person skilled in the art based on the comparative examples. For example, the disclosure is not limited to combinations of the elements shown in the embodiments. The disclosure can be reduced in practice with various combinations. The technical scope of the present disclosure is not limited to the description of the embodiments. The technical scope of the disclosure should be construed to encompass various modifications.

In the above embodiments, the valve timing control apparatus 10 controls the valve timing of the intake valve. It is noted that, the valve timing control apparatus 10 may be applicable to a device, which controls a valve timing of an exhaust valve, as a movable valve, and to a device, which controls valve timings of both the intake valve and the exhaust valve, as movable valves.

In the above embodiments, the rotation sensor, which detects the rotation angle of the motor 20, is the hall elements 102. It is noted that, the rotation sensor may be a magnetoelectric conversion element, such as a magnetoresistive effect element, other than the hall elements.

In the above embodiments, the first thermal conductive portions 122a, 122b, and 122c are in contact with the heat generating components, respectively. It is noted that, the printed circuit board 88 may be interposed between the first thermal conductive portions 122a, 122b, and 122c and the corresponding heat generating components.

The first thermal conductive portions 122a, 122b, and 122c, may be located on the same side of the circuit board 84 (printed circuit board 88). The present configuration enables to simplify the construction.

The second thermal conductive portion 122d may be equipped on the same side as at least one of the first thermal conductive portions 122a, 122b, and 122c. The present configuration enables to simplify the construction.

At least one of the second thermal conductive portions 122d may be equipped to be not in contact with all the first thermal conductive portions 122a, 122b, and 122c.

The connection structure between the three-phase output lines of the inverter and the windings 58 in the circuit board 84 is not limited to the internal connector 106. The connection structure may employ another electric connection structure than the internal connector 106.

In the above embodiments, the motor device 16 is used for the valve timing control apparatus 10. The motor device 16 may be applied to another motor device.

As described above, the motor device includes the case 86, the motor 20, the circuit board 84, and the thermal conduction member 122. The case 86 includes the metallic base 24 and the cover 82, which forms the accommodation space with the base. The motor 20 is located on the side of the surface 44 of the base, which is opposite of the cover mounting surface 62 to which the cover is mounted. The circuit board 84 includes the printed circuit board 88 and the multiple components 90. The circuit board 84 has the circuit to drive the motor. The printed circuit board 88 contains resin as the base material. The printed circuit board 88 has the one side 88a and the rear side 88b. The one side 88a is opposed to the base. The rear side 88b is the opposite surface of the one side in the thickness direction. The printed circuit board 88 is located in the accommodation space and is affixed to the cover mounting surface. The multiple components 90 are mounted to both the one side and the rear side of the printed circuit board. The thermal conduction member 122 has a flexibility. The thermal conduction member 122 is interposed between the circuit board and the case in the thickness direction. The thermal conduction member 122 is in contact with both the circuit board and the case. The multiple components include a heat generating component 92, 94, 104, and 106 located on at least one of the one side and/or the rear side of the printed circuit board. The thermal conduction member includes the first thermal conductive portions 122a, 122b, and 122c and the second thermal conductive portion 122d. The first thermal conductive portions 122a, 122b, and 122c is interposed between the heat generating component and the case. The second thermal conductive portion 122d is formed of the same material as the material of the first thermal conductive portion. The second thermal conductive portion 122d is located on the same side as the first thermal conductive portion relative to the circuit board. The second thermal conductive portion 122d is interposed with the case at a position different from the position of the first thermal conductive portion in the circuit board.

The present configuration enables the first thermal conductive portion to release heat of the heat generating component to the case. The first thermal conductive portion may be in contact directly with the heat generating component and/or may interpose the printed circuit board with the heat generating component.

In addition, the present configuration further includes the second thermal conductive portion as the thermal conduction member, in addition to the first thermal conductive portion. The second thermal conductive portion having flexibility is configured to produce a damper effect to enable to restrict vibration of the printed circuit board caused by vibration of the motor.

In addition, the second thermal conductive portion is formed of the same material as the first thermal conductive portion and is located on the same side as the first thermal conductive portion relative to the circuit board. Therefore, the present simple configuration enables to maintain reliability of the connection structure while securing its heat dissipation property.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A motor device comprising:
   a case including a base and a cover, the base being formed of a metallic material and having a surface and a cover mounting surface, which is on an opposite side of the surface, the cover equipped to the cover mounting surface of the base and defining an accommodation space with the base;
   a motor located on a side of the surface of the base;
   a circuit board located in the accommodation space and including a printed circuit board and a plurality of components forming a circuit to drive the motor, the printed circuit board containing resin as a base material and having a one side and a rear side, the one side being opposed to the base, the rear side being on an opposite side of the one side in a thickness direction, the components being mounted on both the one side and the rear side of the printed circuit board; and
   a thermal conduction member having a flexibility and interposed between the circuit board and the case in the thickness direction, the thermal conduction member being in contact with both the circuit board and the case, wherein
   the components include a heat generating component located on at least one of the one side and the rear side of the printed circuit board,
   the thermal conduction member includes a first thermal conductive portion and at least one second thermal conductive portion,
   the first thermal conductive portion is interposed between the heat generating component and the case,
   the at least one second thermal conductive portion is formed of a material same as a material of the first thermal conductive portion,
   the at least one second thermal conductive portion is located on a same side as the first thermal conductive portion on the circuit board, and
   the at least one second thermal conductive portion is interposed with the case at a second position different from a first position of the first thermal conductive portion.

2. The motor device according to claim 1, wherein
   the components include a tall component, which is taller than an other of the components,
   the tall component is equipped on a surface of the printed circuit board, which is on an opposite side of the heat generating component,
   the heat generating component interposes the first thermal conductive portion with the case,
   the first thermal conductive portion is in contact with the heat generating component, and
   the second thermal conductive portion is in contact with a reverse surface of a portion of the printed circuit board where the tall component is mounted.

3. The motor device according to claim 1, wherein
   the circuit board is affixed to the base with two screws, and the second thermal conductive portion is located on a virtual straight line, which virtually connects stationary positions at which the circuit board is affixed with the screws.

4. The motor device according to claim 1, wherein
the heat generating component, which interposes the first thermal conductive portion with the case, is located on the one side of the printed circuit board,
the cover mounting surface of the base defines a recessed portion correspondingly to the heat generating component, and
the first thermal conductive portion is located at the recessed portion and is in contact with the heat generating component.

5. The motor device according to claim 4, wherein
the motor includes a stator, a rotor, and a sensor magnet,
the rotor is rotational inside the stator,
the sensor magnet is mounted on a surface of an outer peripheral end of the rotor on a side of the base for detection of a rotary position of the rotor,
the base defines a recess being a magnet accommodating portion formed on an opposite of the cover mounting surface correspondingly to the sensor magnet, and
the recessed portion does not overlap with the magnet accommodating portion in a projection view viewed in a thickness direction.

6. The motor device according to claim 1, wherein
the motor device is equipped to a valve timing control apparatus configured to control a valve timing of an internal combustion engine with rotation of the motor.

* * * * *